United States Patent
Hanstrom et al.

(10) Patent No.: US 8,843,546 B2
(45) Date of Patent: Sep. 23, 2014

(54) METHOD AND ARRANGEMENT FOR ENABLING DIFFERENTIATED COMMUNICATION SERVICES

(75) Inventors: Nils Hanstrom, Ronninge (SE); Fredrik Alriksson, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 121 days.

(21) Appl. No.: 13/319,471

(22) PCT Filed: May 8, 2009

(86) PCT No.: PCT/SE2009/050513
§ 371 (c)(1),
(2), (4) Date: Nov. 8, 2011

(87) PCT Pub. No.: WO2010/128913
PCT Pub. Date: Nov. 11, 2010

(65) Prior Publication Data
US 2012/0059878 A1    Mar. 8, 2012

(51) Int. Cl.
*G06F 15/16* (2006.01)
*H04L 29/08* (2006.01)

(52) U.S. Cl.
CPC .............. *H04L 67/16* (2013.01); *H04L 67/306* (2013.01)
USPC ............ 709/203; 709/201; 709/202; 709/204

(58) Field of Classification Search
USPC ......................... 709/201, 202, 203
See application file for complete search history.

(56) References Cited

U.S. PATENT DOCUMENTS

| 8,166,129 B2* | 4/2012 | Gourraud ...................... 709/217 |
| 8,305,983 B2* | 11/2012 | Siegel et al. .................. 370/329 |
| 2004/0068574 A1* | 4/2004 | Costa Requena et al. .... 709/230 |
| 2005/0149731 A1* | 7/2005 | Leppanen et al. ............ 713/168 |
| 2005/0190772 A1* | 9/2005 | Tsai et al. ................ 370/395.52 |
| 2006/0136395 A1* | 6/2006 | Rhee et al. ........................ 707/3 |
| 2006/0140385 A1 | 6/2006 | Haase et al. |
| 2007/0086582 A1* | 4/2007 | Tai et al. .................. 379/114.01 |

(Continued)

OTHER PUBLICATIONS

3GPP 3rd Generation Partnership Project; Technical Specification Group Core Network; IP Multimedia (IM) session handling; IM call model; Stage 2 (Release 7)—Jun. 2006—TS 23.218 V7.2.0—pp. 1-58.*

(Continued)

*Primary Examiner* — Jeffrey Nickerson
*Assistant Examiner* — Linh T Nguyen

(57) ABSTRACT

Methods and arrangements for enabling execution of a communication service adapted to a client by an application server. One or more iFC:s are configured in a central subscriber data node for the client by including information related to user specific service data of the client in the iFC:s. When receiving a request related to the client, a session control node fetches the iFC:s of the client from the subscriber data node if the client is not registered. The service data related information is then extracted from an iFC of the client that matches the received request, which is forwarded to the application server with extracted service data related information attached. The application server creates user specific service data for the client based on service data related information in the request, and serve the client accordingly. No regular provisioning operation and interface towards a provisioning system are required for the application server.

7 Claims, 5 Drawing Sheets

(56) References Cited

U.S. PATENT DOCUMENTS

| | | | |
|---|---|---|---|
| 2007/0115940 A1* | 5/2007 | Kamen et al. | 370/352 |
| 2007/0183411 A1* | 8/2007 | Song et al. | 370/352 |
| 2009/0011763 A1 | 1/2009 | Torres | |
| 2009/0093249 A1* | 4/2009 | Zhu et al. | 455/433 |
| 2010/0049794 A1* | 2/2010 | Shi | 709/203 |
| 2011/0026506 A1* | 2/2011 | Macnaughtan et al. | 370/338 |
| 2011/0111734 A1* | 5/2011 | Walker et al. | 455/414.1 |

OTHER PUBLICATIONS

Digital cellular telecommunications system (Phase 2+); Universal Mobile Telecommunications System (UMTS); LTE; IP Multimedia (IM) session handling; IM call model; Stage 2 (3GPP TS 23.218 version 8.4.0 Release 8); ETSI TS 123 218 ETSI Standard, European Telecommunications Standards Institute (ETSI), Sophia Antipolis Cedex, France, vol. 3-CN1, No. V8.4.0, Jan. 1, 2009, XP014043017.

* cited by examiner

Mask for Service Profile 1:    Service data info = "007F"

| a | b | c | d | e | f | g | h | i | j | k | l | m | n | o | p |
|---|---|---|---|---|---|---|---|---|---|---|---|---|---|---|---|
| 0 | 0 | 0 | 0 | 0 | 0 | 0 | 0 | 0 | 1 | 1 | 1 | 1 | 1 | 1 | 1 |

Allowed Services in Service Profile 1:

| -- | j | k | l | m | n | o | p |
|----|---|---|---|---|---|---|---|
|    | OIP | TIP | HOLD | CDIV | CONF | ACR/CB | ECT |

METHOD AND ARRANGEMENT FOR ENABLING DIFFERENTIATED COMMUNICATION SERVICES

TECHNICAL FIELD

The invention relates generally to a method and arrangement for configuring or provisioning an application server with user specific service data needed to adapt and deliver one or more communication services for a client.

BACKGROUND

With the emergence of new technologies for mobile telephony, packet-based communication solutions using IP (Internet Protocol) have been developed to support the usage of multimedia services, while different mobile and fixed user terminals with new functionalities for multimedia communication are emerging on the market. Services are also constantly being developed for terminal users to increase the field of usage and enhance the experience when generally consuming communication services.

An IMS (IP Multimedia Subsystem) network can be used for enabling multimedia services and other communication services by initiating and controlling sessions for user terminals connected to various different access networks. The sessions are handled by specific session control nodes in the IMS network, including those referred to as CSCF (Call Session Control Function) nodes.

The signalling protocol called "SIP" (Session Initiation Protocol) is used for multimedia sessions in IMS networks and other communication services networks. IMS is mentioned in this description for illustrative purposes, without limiting the invention to IMS networks exclusively. A user and his/her communication terminal is often generally referred to as a "client", which term will be used in this description.

FIG. 1 illustrates a conventional communication scenario involving an IMS network 100 serving a client A using a mobile terminal connected to a mobile access network 102. The IMS network 100 comprises various session control nodes, including P-CSCF (Proxy CSCF) 104 providing a point of contact for clients in network 102, S-CSCF (Serving CSCF) 106 controlling various sessions for client A, and I-CSCF 108 (Interrogating CSCF) providing an interface towards other IMS networks (not shown) and which also queries a subscriber database node HSS (Home Subscriber Server) 110 for client related information during client registration and termination. The HSS database 110 thus stores subscriber and authentication data which can be retrieved by other nodes for serving and handling different clients.

The IMS network 100 also comprises a plurality of application servers 112 configured to provide different communication services when invoked to meet service requests for clients. Each application server 112 may be configured to provide a specific service or a particular set of services. The application servers 112 are linked to the session control signalling over an interface to the S-CSCF node 106 called the ISC (IMS Service Control) interface.

The application servers 112 are further configured to execute their services according to certain predefined criteria and corresponding instructions referred to as iFC (initial Filter Criteria) which are maintained in the HSS node 110 for clients. Among other things, the iFC contains criteria for when the iFC is to be applied for an incoming service or registration request, and also instructions for how the S-CSCF node 106 should act when those criteria are fulfilled, i.e. when the iFC criteria matches the request and thereby triggers. When applied, the iFC thus identifies or points to a particular application server to be used for executing one or more specific services for the requesting client. The S-CSCF node 106 then sends the request to the identified application server with that server's name added to a route header of the request.

One or more iFC:s valid for different services can be included in a profile defined for a client. When a client not previously registered either makes a new registration request, or a request bound for the client is received for a particular service, the S-CSCF node 106 downloads the iFC:s associated to the client from HSS 110 and invokes an appropriate application server 112 accordingly to serve the client, e.g. to execute a requested service. Once downloaded from the HSS, the iFC:s are stored or cached in the S-CSCF node 106 for future use whenever other originating or terminating requests are received for the client.

In order to provide differentiated communication services to clients, it is necessary to store and maintain user specific service data in multiple nodes in the IMS network, such as various application servers and the above-described HSS node, as well as other nodes such as and DNS (Domain Name Server)/ENUM, and so forth. This process is referred to as "provisioning" and typically involves establishment of iFC data, service authorisation data which specifies what service(s) a client is authorised to use, and service configuration data which specifies how the service(s) should be executed for the client. The term "service data" will be used for short in this description to represent the service authorisation and configuration data above.

The service data should thus be provisioned in corresponding application servers to enable delivery of services adapted to individual clients, and the provisioning activities are performed by means of a provisioning system, as illustrated in FIG. 2. Furthermore, user specific service data in the HSS and application servers must be coordinated and consistent, for which the provisioning system 200 is responsible. Thus, provisioning system 200 has a so-called "northbound" interface towards an administrator 202 which could be a person and/or a network operator's Customer Administration System or the like, for adding, modifying or deleting user specific service data, e.g. in an IMS network.

The provisioning system 200 in FIG. 2 comprises a schematically shown provisioning logic 200a which basically processes input data from administrator 202 and creates provisioning data that is supplied over dedicated "southbound" interfaces to different nodes in the IMS network, in this case including an application server (AS) 204, an HSS node 206 and an ENUM/DNS node 208. Hence, the provisioning system 200 must handle several different interfaces and is responsible for keeping the user specific service data consistent and up-to-date in all these nodes.

An application server can maintain such service data for users either in a local storage connected to the server or in a central storage accessible for multiple application servers, e.g. the subscriber data node HSS. The user specific data stored in HSS is sometimes referred to as transparent data or "BLOB" which is maintained and used by the application server, and non-transparent data which more generally relates to non application server specific data such as subscriber identities and other network related user data. Both transparent and non-transparent user data in HSS can be accessed by the application server over the Sh interface.

The provisioning logic 200a with its multiple interfaces towards different nodes, is typically quite complex and costly to develop and maintain. It is possible to reduce the provisioning complexity by using "default" service data and policies preconfigured locally in the application servers, instead of provisioning the user specific service data. However, the service data will then be the same for all users and differentiated services in terms of service authorisation and configuration cannot be accomplished for different clients. It is thus a problem of complexity in the provisioning logic and also capacity in the provisioning system, while differentiated communication services adapted to specific clients are desirable.

SUMMARY

It is an object of the invention to address at least some of the issues above. In particular, it is an object to provide a solution that may be used to reduce complexity in the provisioning logic, save capacity in the provisioning system and yet be able to generally provide differentiated communication services adapted to specific clients. These objects and others may be obtained by using methods and arrangements according to the attached independent claims.

According to different aspects, methods and arrangements are provided for enabling execution of a communication service adapted to a client where service data is provisioned for the client in an application server.

According to one aspect, a method is provided where one or more iFC:s are configured for the client in a central subscriber data node by including information related to user specific service data valid for the client in the iFC:s. The user specific service data comprises service authorisation data and/or service configuration data for the client. When the iFC:s of the client are fetched from the central subscriber node to a session control node serving the client, the service data related information is extracted from an iFC of the client that matches a request related to the client that has been received at the session control node.

The received request is then forwarded from the session control node to the application server with the extracted service data related information attached. The user specific service data can then be created for the client in the application server based on the service data related information in the request, in order to apply the user specific service data when serving the client.

According to another aspect, an arrangement is provided in a session control node configured to enable execution of a communication service adapted to a client by an application server. According to this arrangement, a receiving unit is adapted to receive a request for the client when non-registered. A fetching unit is adapted to fetch, from a central subscriber data node, one or more iFC:s configured for the client and including information related to user specific service data valid for the client, where the user specific service data comprises service authorisation data and/or service configuration data for the client.

Further, an extracting unit is adapted to extract the service data related information from an iFC of the client that matches the received request. Finally, a forwarding unit is adapted to forward the received request to the application server with the extracted service data related information attached. The application server will then be able to create the user specific service data for the client based on the service data related information in the request, in order to apply the user specific service data when serving the client.

According to another aspect, a method is provided in an application server for enabling a communication service adapted to a client. In this method, a request related to the client is received from a session control node with information attached relating to user specific service data valid for the client. The user specific service data comprises service authorisation data and/or service configuration data for the client, and the attached service data related information has been extracted from an iFC of the client that matches the request. Then, user specific service data for the client is created or modified in the application server based on the service data related information in the request, and the created or modified user specific service data is applied when serving the client.

According to another aspect, an arrangement is provided in an application server for enabling a communication service adapted to a client. According to this arrangement, a request managing unit is adapted to receive, from a session control node, a request for the client with information attached relating to user specific service data valid for the client. Again, the user specific service data comprises service authorisation data and/or service configuration data for the client, and the attached service data related information has been extracted from an iFC of the client that matches the request. Further, a service data unit is adapted to create or modify user specific service data for the client in the application server based on the service data related information in the request, for serving the client according to the service data.

By implementing the invention according to any of the above aspects, the application server is able to provide differentiated communication services adapted to specific clients, even when the concerned application server is auto-provisioned without using an interface towards the provisioning system. The invention can thus combine auto-provisioning in the application server and personalised service execution. As a result, complexity in the provisioning logic can be reduced and capacity can be saved in the provisioning system. Another advantage is that the load on the application server will be spread out over time, since the provisioning is performed whenever a request is made related to a non-registered client.

The methods and arrangements above can be implemented according to different embodiments. In one embodiment, the service data related information comprises a pointer or indicator referring to a predefined document template describing the user specific service data, where the template is preconfigured and known in the application server. Alternatively, the service data related information may comprise a list of services the client is authorised to use, or a service document explicitly describing services the client is authorised to use and how these services should be configured in adaptation to the client. The above list of services may be in the form of a binary mask that can be mapped to a predefined set of service parameters to create the user specific service data for the client.

In another embodiment, if the received request is a REGISTER request, the matching iFC may have the service data related information in a Service Information field of the iFC, and in that case the service data related information can be passed to the application server from the session control node in the body of the forwarded REGISTER request.

In another embodiment, the matching iFC may have the service data related information as a parameter in an Application Server Name URL field of the iFC, which is passed to the application server from the session control node as a URI parameter in a route header of the forwarded service request.

In yet another embodiment, the session control node receives from the central subscriber data node an updated iFC configured for the client which contains corresponding new service data related information. The session control node can then forward any subsequently received service request for the client to the application server with the new service data related information attached, and the application server updates the user specific service data based on the new service data related information in the forwarded request.

Further features of the invention and its benefits will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

Figure 1:
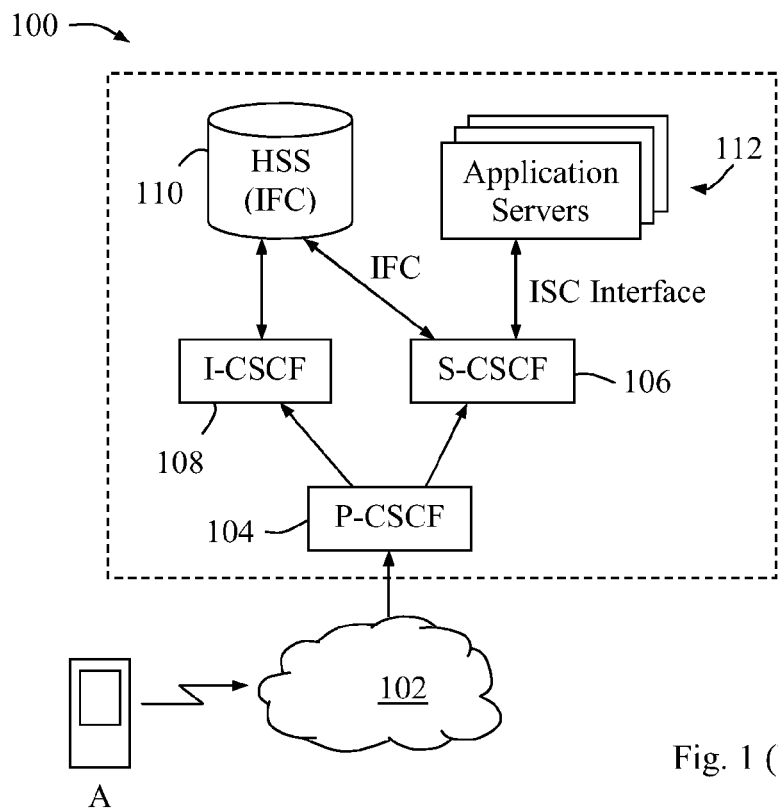
FIG. 1 is a block diagram illustrating an IMS network serving a client A, according to the prior art.
Figure 2:
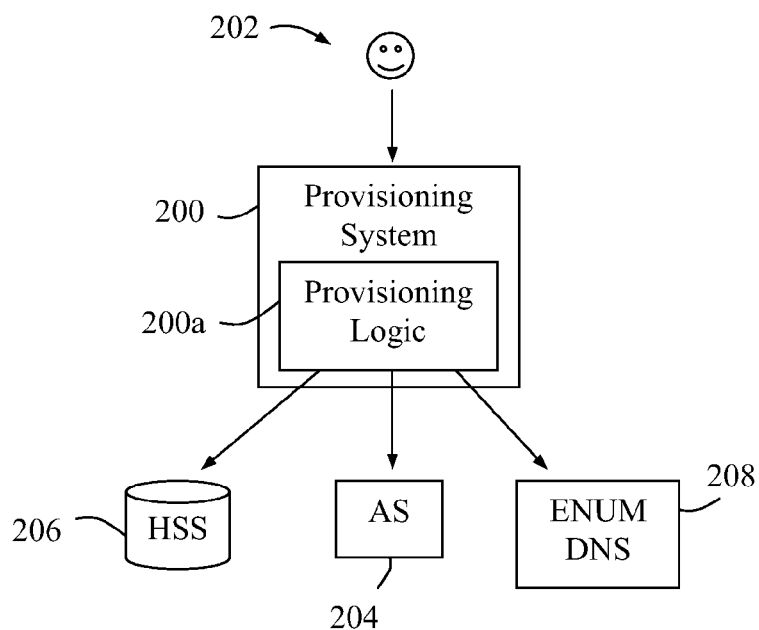
FIG. 2 is a block diagram illustrating a conventional provisioning procedure, according to the prior art.

In order to overcome the above-described complexity in the provisioning system, it has been suggested to use so-called "auto-provisioning" for application servers. The invention can be used to obtain certain advantages associated with auto-provisioning of application servers including elimination of the need for a provisioning interface between the provisioning system 200 and the application server 204 in FIG. 2. The invention also enables differentiated communication services adapted to specific clients, even when the concerned application server is auto-provisioned without using an interface towards the provisioning system, which will be described further below.

Auto-provisioning of an application server means generally that service data is created for a not yet registered client in the application server when receiving a request related to this client. If no such service data has been stored previously for the client, the application server can assume that this is a non-registered client and use auto-provisioning procedures to generate service data for the client.

In this invention, the application server is also able to create user specific service data even without being provisioned by the provisioning system, to be further described below, and thereby adapt a requested service to the client in accordance to the user specific service data. Throughout this description, the term "non-registered client" refers to a client that has not already been registered in the network and provisioned in the application server.

A procedure for enabling delivery of a service adapted to a client in an application server, will now be described with reference to the communication scenario shown in FIG. 3. A provisioning system 300 is utilised for provisioning client data and client profiles in an HSS node 302, or more generally, a central "subscriber data node".

A first step 3:1 illustrates that one or more modified iFC:s 302a are configured in the HSS node 302 for a client A, the term "modified" indicating that information related to user specific service data valid for client A is now included in each iFC, in contrast to conventional iFC:s. The user specific service data comprises service authorisation data which specifies what service(s) a particular client is authorised or allowed to use, and/or service configuration data which specifies how the service(s) should be executed for that particular client.

Step 3:1 basically represents a configuring operation which can be performed manually or by using automatic mechanisms, while all subsequent steps in the figure basically represent a "run-time" operation performed automatically. One advantage of this solution is that user specific service data can be provisioned for client A in an application server during the run-time phase, i.e. when an originating or terminating request is received for the client when not already registered and provisioned, e.g. a registration request from the client. Thereby, the provisioning load on the application server will be effectively spread out in time.

According to different possible alternatives, the service data related information may be included in the iFC:s in different ways, e.g. as implied by a brief reference or explicitly described more or less in its entirety. In one example, the service data related information is configured to comprise a reference in the form of a pointer or indicator referring to a predefined document template describing the user specific service data, the template being preconfigured and known in the application server to be invoked according to that iFC. The template reference may be contained in each iFC as a parameter in an Application Server Name URL field, which will be placed in a route header of a request forwarded to the application server.

In another example, the service data related information is configured to indicate a list of services the client is authorised or allowed to use. In that case, the list of allowed services may be indicated by means of a reference to a binary mask that can be mapped to a predefined set of service parameters. The binary mask reference and list of allowed services are preconfigured and known in the application server. The invoked application server can thereby use the binary mask reference to create the user specific service data for the client A. An example of using a binary mask will be described later with reference to FIGS. 9a and 9b. The binary mask reference may likewise be contained in the Application Server Name URL field of each iFC, which will be placed in a route header of a request forwarded to the application server.

In yet another example, the service data related information is configured to comprise an explicit service document describing services the client is authorised to use and how these services should be configured in adaptation to the client. The service document may then be contained in an already existing Service Information field of each iFC and attached to the body of the request when forwarded to the application server. Since there is generally more space available in the Service Information field, it can carry an extensive service document, while the Application Server Name URL field may only be able to carry a much shorter implicit reference.

At some point later, i.e. during the run-time phase, a request related to the non-registered client A is received in an S-CSCF node 304, or more generally a session control node, as shown by a next step 3:2. The request may be made by client A, or by another party for communication with client A. According to existing mechanisms in the S-CSCF node 304 described above, when a non-registered client makes a registration request or a request for a particular service, relevant iFC:s of that client are fetched from HSS 302. The previously configured iFC:s 302a of client A are thus fetched from HSS 302 in a next step 3:3, e.g. when recognising that no iFC:s are already stored in the S-CSCF node for client A.

The client's iFC:s are then compared with the received request in order to find a matching iFC which then accordingly triggers, or "fires", when criteria in that iFC are fulfilled in the request, in accordance with regular procedures. The matching iFC also contains instructions for how the S-CSCF node 304 should handle the request, as described above, including invocation of an appropriate application server 306 identified in the iFC, to serve the client. The iFC:s fetched in step 3.3 are also stored or cached in the S-CSCF node 304 for future use whenever further requests are received related to the client.

In this solution, the matching and triggered iFC contains service data related information valid for client A, as configured in step 3:1 above. The S-CSCF node 304 extracts the service data related information from the iFC, in a further step 3:4. The iFC also identifies or points to application server 306 according to the existing mechanism. Then, the S-CSCF node 304 forwards the received request to the identified application server 306 with the extracted service data related information attached, in a next step 3:5. As said above, the service data related information may either be contained in a service information field of the iFC and attached in the body of the request, or be contained in the application server name URL field and attached in the route header of the request.

The application server 306 is now able to create user specific service data for the client based on the service data related information in the received request. Application server 306 finally applies the created user specific service data when adapting and executing a communication service for the client, in a last shown step 3:6.

In the procedure described above for FIG. 3, the request received in step 3:2 may be a REGISTER request when the client connects to the network. In that case, the matching iFC may have been configured with the service data related information in the already existing Service Information field of the iFC. The service data related information can then be contained in the body of the REGISTER request that is forwarded from the S-CSCF node 304 to the application server 306 in step 3:5.

As mentioned above, the request may also refer to a specific communication service involving client A, e.g. an originating or terminating session request, to be handled by application server 306. In either case, the service data related information may be included as a parameter in an Application Server Name URL field of the matching iFC, which can be provided as a URI parameter in a route header of the service request forwarded from S-CSCF node 304 to application server 306.

Figure 3:
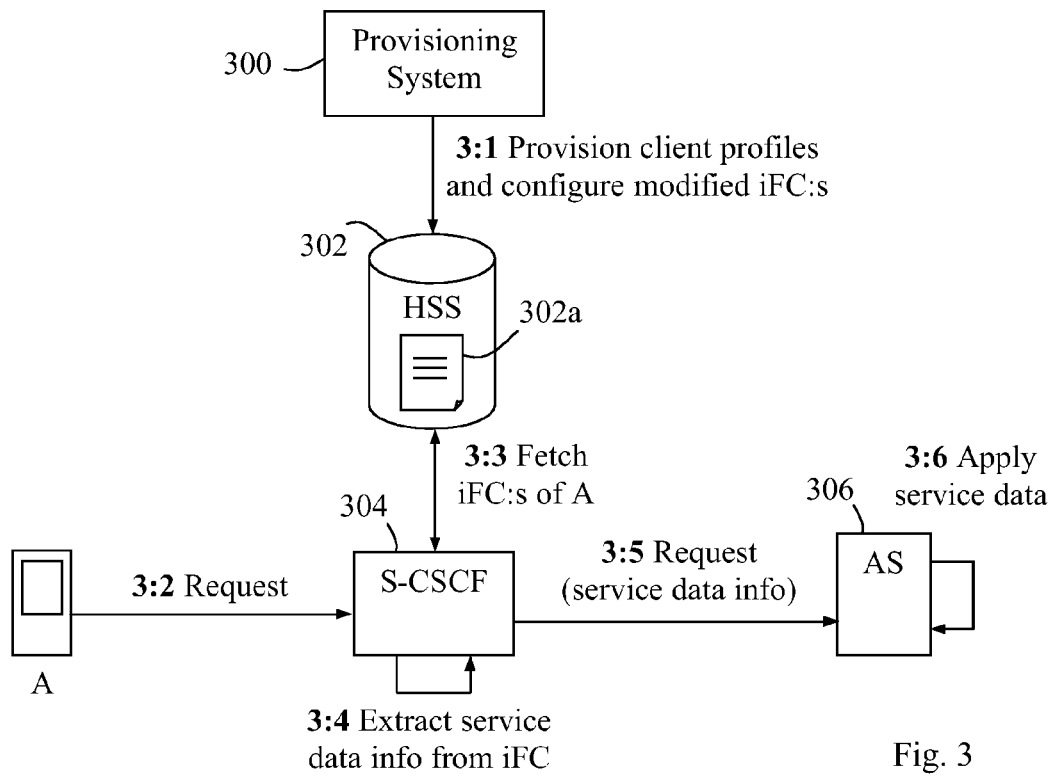
FIG. 3 is a block diagram illustrating a communication scenario when provisioning a client in an application server, according to one exemplary embodiment.
Figure 4:
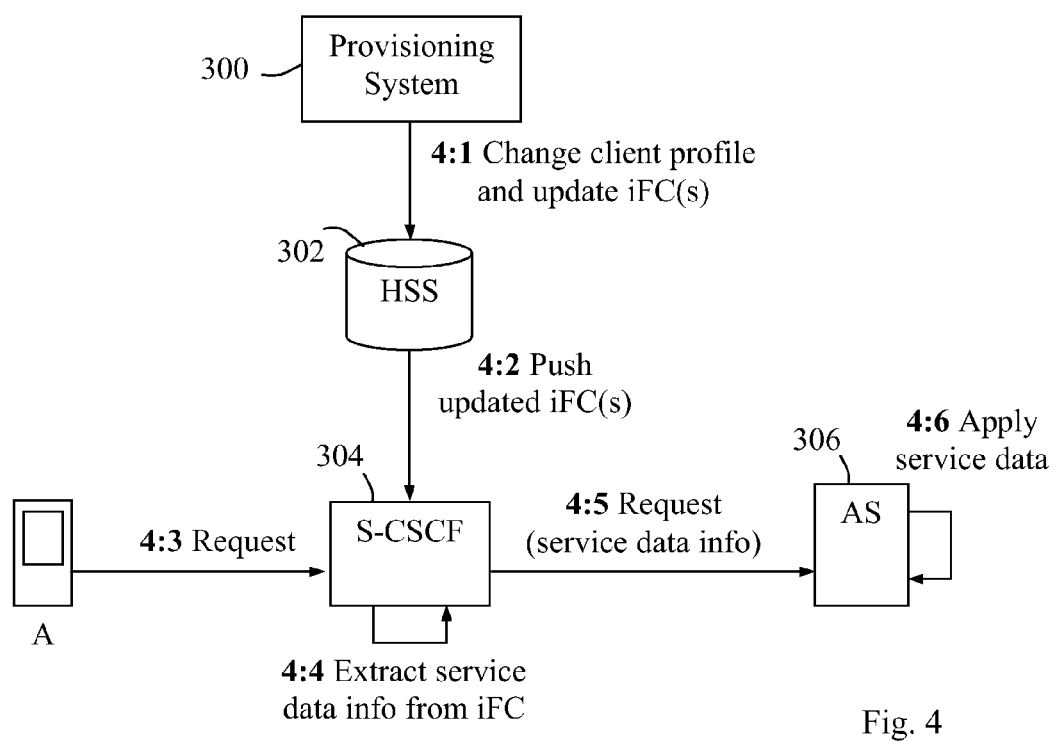
FIG. 4 is a block diagram illustrating a communication scenario when changing the provisioning of the client in the application server, according to another exemplary embodiment.

FIG. 4 illustrates how the provisioning of client A made in the application server according to FIG. 4, can be changed according to one possible embodiment, using the same nodes shown in FIG. 3. A first step 4:1 illustrates that the profile for client A is changed in the HSS 302 and that one or more of the previously configured iFC:s are updated by changing the service data related information therein accordingly. For example, client A may be authorised to use new services, or may be deprived of authorisation for some service(s), or the service configuration data for client A may be changed for some service(s), for whatever reason. The one or more updated iFC:s are then pushed from HSS 302 to the S-CSCF node 304, as shown in a following step 4:2.

In a next step 4:3, an originating or terminating request related to client A is received at the S-CSCF node 304, and the iFC:s of client A already stored in S-CSCF node 304 are compared with the request. In this example, a matching and updated iFC with criteria fulfilled by the received request is found at the S-CSCF node 304, and the new service data related information is then extracted from the matching iFC in a following step 4:4, basically as described for step 3:4 above.

The extracted service data related information of client A is attached to the request which is sent to the application server 306 in a following steps 4:5. The application server 306 can then create new service data for the client based on the new service data related information in the received request. The new service data is finally applied when application server 306 executes the service for client A in a last step 4:6. In this way, the service data can be changed and applied in the application server for a client already provisioned, effectively updating the provisioning of client A in application server 306 without requiring a conventional provisioning operation.

Figure 5:
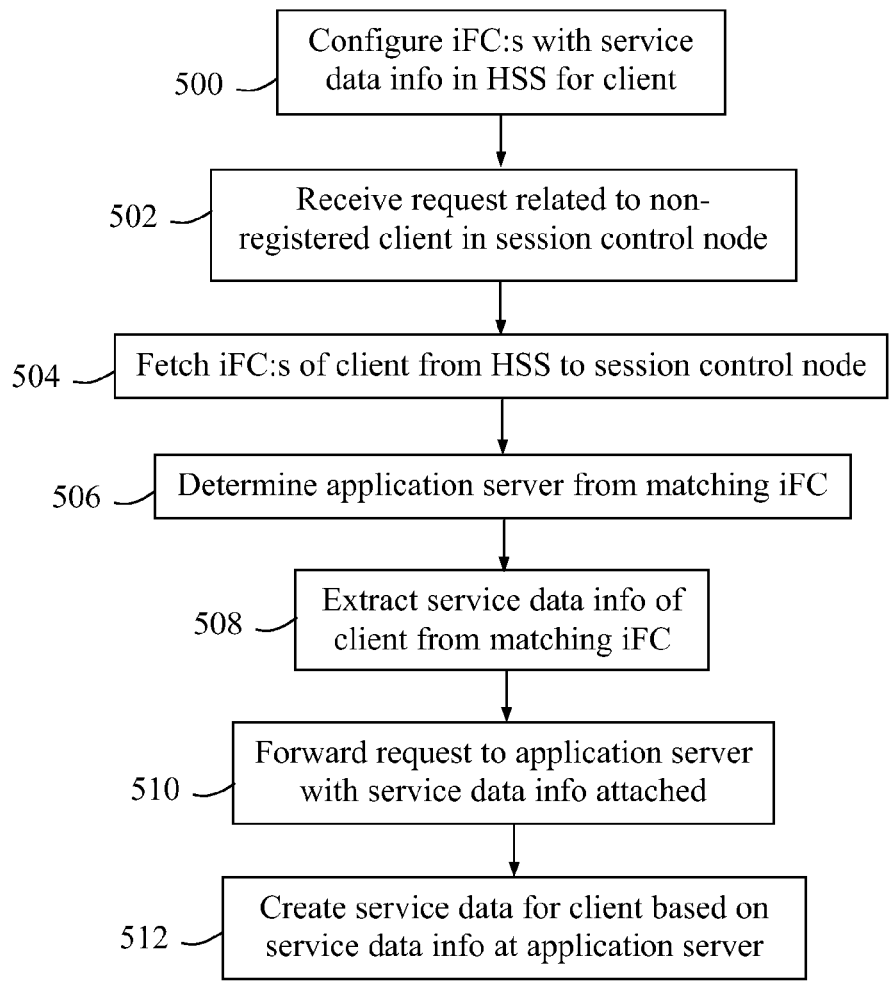
FIG. 5 is a flow chart illustrating a procedure for enabling a service adapted to a client in an application server, according to yet another exemplary embodiment.

An exemplary procedure for enabling delivery of a service adapted to a client in an application server, will now be described with reference to the flow chart in FIG. 5. In a first step 500, iFC:s are configured for a client in a subscriber database node, or HSS node for short, the iFC:s including information related to user specific service data valid for client A, basically corresponding to step 3:1 above. Step 500 can be seen as a configuration phase.

In a next step 502, a request related to the client is received in a session control node, e.g. an S-CSCF node, when the client is not yet registered, basically corresponding to step 3:2 above. The request may come from the client or from another party intending to activate a service for the client, e.g. to communicate with the client. Then in a following step 504, when recognising that no IFC:s are already stored in the session control node for the client, the session control node fetches the previously configured iFC:s of the client from the HSS node, basically corresponding to step 3:3 above. It should be noted that the session control node can just follow regular procedures for handling the iFC:s of the client when receiving the request and does not need to be aware that the iFC:s contain the service data related information according to this solution.

In a next step 506, the session control node also finds an iFC matching the request and determines from the matching iFC which application server to execute the service, likewise according to regular procedures. The session control node further extracts the service data related information from the iFC in a step 508, and forwards the request to the identified application server with the extracted service data related information attached, in a further step 510, basically corresponding to steps 3:4 and 3:5 above. The application server is now able to create or modify user specific service data for the client based on the service data related information attached to the received request, in a final step 512, which then can be applied when serving the client, e.g. for executing a service request related to the client.

Figure 6:
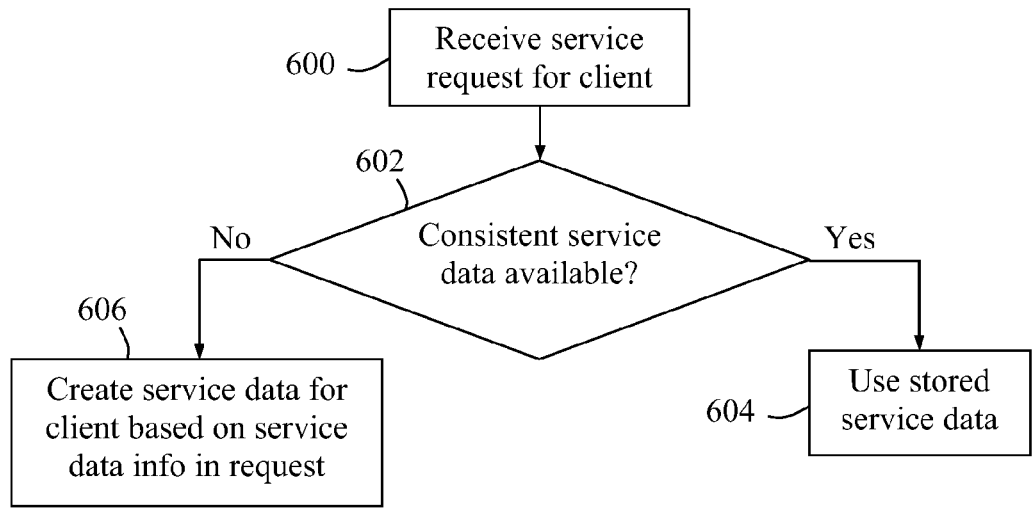
FIG. 6 is a flow chart illustrating a procedure executed by an application server for enabling a communication service adapted to a client, according to yet another exemplary embodiment.

An exemplary procedure for executing a communication service adapted to a client, as performed by an application server, will now be described with reference to the flow chart in FIG. 6. In a first step 600, the application server receives a request for the client from a session control node, e.g. an S-CSCF node. According to this solution, the request has service data related information attached, which has been accomplished in accordance with the above-described procedures of steps 3:1-3:5, or steps 4:1-4:5, or steps 500-510.

The application server may then check whether user specific service data valid for the client and consistent with the request, is already available in a next step 602, which in that case has been stored in a local storage at the application server or at a central storage for such service data. If so, and if the already available data corresponds to, i.e. is consistent with, the service data related information attached to the received request, the stored service data can be used by the application server in a step 604 to handle the request, e.g. for executing a service for the client.

On the other hand, if no such service data of the client is available, or if the already available data is not consistent with the service data related information attached to the received request, the necessary service data can be created based on the service data related information attached to the received request, in a step 606.

An exemplary session control node will now be described in more detail with reference to FIG. 7. The session control node 700 may basically be configured to act as the S-CSCF node 304 in FIG. 3 and/or to participate in the process shown in FIG. 5. The session control node 700 comprises a receiving unit 700a adapted to receive a request R related to the client when not yet registered. The request R may come from the client or from another party, as described above, schematically being received from a core network CN serving the requesting party.

The session control node 700 further comprises a fetching unit 700b adapted to fetch, from a central subscriber data node 702, e.g. an HSS node, one or more iFC:s which have been configured for the client in the node 702 to include information related to user specific service data valid for the client. The user specific service data comprises service authorisation data and/or service configuration data for the client, as described above.

The session control node 700 further comprises an extracting unit 700c adapted to extract the service data related information SD from an iFC (match) of the client that matches the received request, and a forwarding unit 700d adapted to forward the received request to the application server with the extracted service data related information attached R(SD). The application server is thereby able to create or modify the user specific service data for the client based on the service data related information SD in the request, in order to apply the user specific service data when adapting and executing a requested service for the client.

An exemplary application server will now be described in more detail with reference to FIG. 8, which is capable of handling requests from the session control node 700 in FIG. 7 as follows. Further, the application server 800 may basically be configured to act as the application server 306 in FIG. 3 and/or to execute the process shown in FIG. 6. In this example, the application server 800 has a plurality of a predefined document templates T1, T2, T3 . . . describing different sets of user specific service data which can be applied for different incoming requests.

The application server 800 comprises a request managing unit 800a adapted to receive, from the session control node 700, a service request R related to the client with service data related information SD attached that session control node 700 has extracted from an iFC of the client that matches the request. In this case, the service data related information SD is a reference in the form of a pointer or indicator referring to one of the service templates, in this case T3. The application server may be adapted to check whether user specific service data valid for the client is already available from a local or central storage 802 for such service data, as indicated by the two-way arrow.

The application server 800 also comprises a service data unit 800b adapted to create or modify user specific service data based on the service data related information SD in the request, e.g. if no data was already available from the storage 802 or if data already available from the storage 802 did not match the service data related information SD attached to the received request, for adapting and executing the communication service for the client according to the service data. Thus, new service data must be created if no such data is available in the storage 802, otherwise non-matching data available in the storage 802 can be merely modified.

In this example, the service data unit 800b creates or modifies the user specific service data from the document template T3 to which the service data related information SD refers. However, the service data unit 800b is not limited thereto but may also be capable of creating or modifying the user specific service data in other ways, as described above.

Figure 7:
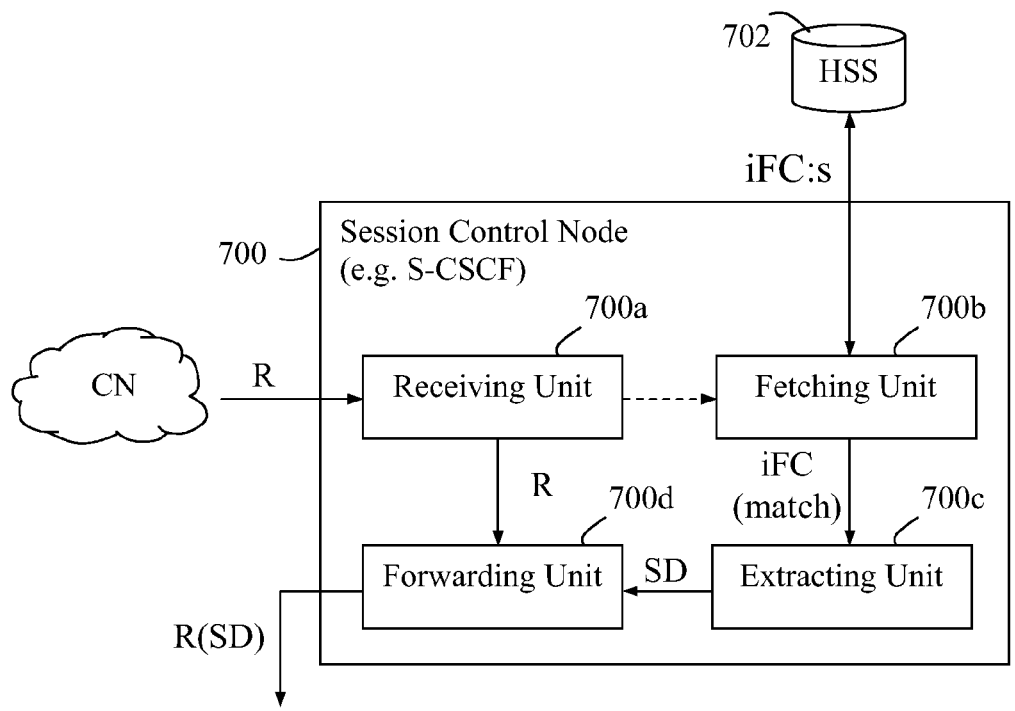
FIG. 7 is a block diagram illustrating a session control node in more detail, according to further exemplary embodiments.
Figure 8:
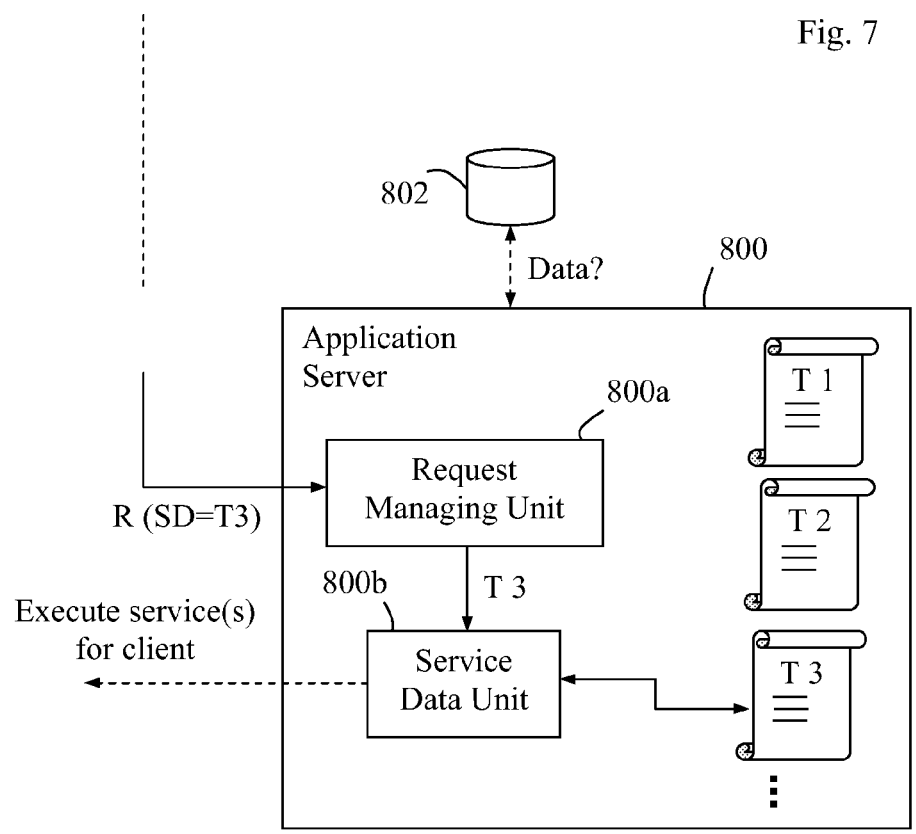
FIG. 8 is a block diagram illustrating an application server in more detail, according to further exemplary embodiments.

It should be noted that FIGS. 7 and 8 merely illustrate various functional units in the session control node 700 and the application server 800 in a logical sense. However, the skilled person is free to implement these functions in practice using any suitable software and hardware means. Thus, the invention is generally not limited to the shown structures of the session control node 700 and the application server 800.

Figures 9A, 9B:
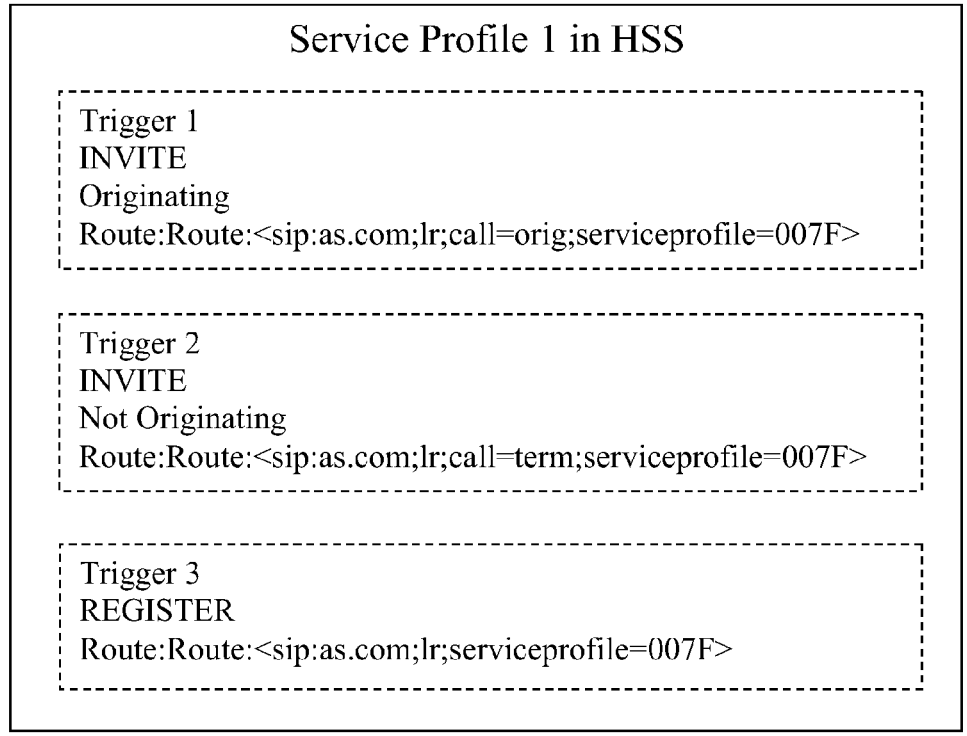
FIG. 9a illustrates schematically an example of how allowed services in a service profile can be indicated by a binary mask.
FIG. 9b illustrates schematically how the service profile of FIG. 9a may be configured in the HSS node.

Finally, FIGS. 9a and 9b illustrate an example of how allowed services in a service profile 1 can be indicated by a binary mask. As shown in FIG. 9a, the binary mask has 16 positions corresponding to 16 different services "a" through "p", respectively. Each mask position can have a value of either 1 or 0 to indicate whether the corresponding service is enabled or not. FIG. 9b illustrates three iFC:s with different triggers for different requests, namely INVITE (originating), INVITE (not originating) and REGISTER.

In the shown example, services "a" through "i" are all disabled (0), i.e. not allowed to use for the client, whereas services "j" through "p" are all enabled (1), i.e. authorising the client to use them. FIG. 9a also shows what actual services "j" through "p" represent, which are thus available according to service profile 1. The binary mask is represented by a reference "007F", known to the application server, which can be included as a parameter "serviceprofile=007F" in an Application Server Name URL field of the iFC:s shown in FIG. 9b. That Application Server Name URL will then be placed in a route header of a request when forwarded to the application server.

When implementing the invention according to any of the above-described embodiments, it is not necessary to employ a provisioning mechanism and interface between the provisioning logic 200a and the application server 204 as described above for FIG. 2. Instead, auto-provisioning can be employed and still enabling individual or personalised service execution based on service data adapted to the client to be served by the application server. Another advantage is that the load on the application server will be spread out over time, since the provisioning is performed whenever a request is made related to a non-registered client.

While the invention has been described with reference to specific exemplary embodiments, the description is generally only intended to illustrate the inventive concept and should not be taken as limiting the scope of the invention, which is defined by the appended claims.

The invention claimed is:

1. In a telecommunication network, a method of enabling execution of a communication service adapted to a client by an application server, the method comprising the following steps:
   configuring in a central subscriber data node one or more initial Filter Criteria (iFC) for the client by including service data information related to user specific service data valid for the client in the one or more iFC, the user specific service data comprising service authorization data or service configuration data for the client,
   fetching the one or more iFC of the client from the central subscriber node to a session control node when a request related to the client is received at the session control node,
   extracting, at the session control node, service data information from a matching iFC from the one or more iFC of the client that matches the request related to the client received at the session control node,
   forwarding the request from the session control node to the application server with the service data information attached, and
   creating the user specific service data for the client in the application server based on the service data information attached in the request, in order to apply the user specific service data when the application server is serving the client,
   wherein the service data information comprises a pointer or indicator referring to a predefined document template describing the user specific service data, the template being preconfigured and known in the application server.

2. The method according to claim 1, the matching iFC having the service data information as a parameter in an Application Server Name URL field of the matching iFC, which is passed to the application server from the session control node as a URI parameter in a route header of the request.

3. The method according to claim 1, wherein the session control node receives an updated iFC configured for the client from the central subscriber data node, the updated iFC containing corresponding new service data information, and forwards any subsequently received request for the client to the application server with the new service data information attached, wherein the application server updates the user specific service data based on the new service data information in the subsequently received request.

4. A method in an application server for enabling a communication service adapted to a client, the method comprising the following steps:
   receiving, from a session control node, a request related to the client with service data information relating to user specific service data valid for the client, the user specific service data comprising service authorization data or service configuration data for the client, wherein the service data information has been extracted from a matching initial Filter Criteria (iFC) from one or more iFC of the client that matches the request, and
   creating or modifying user specific service data for the client in the application server based on the service data information attached in the request, and
   applying the user specific service data when serving the client,
   wherein the service data information comprises a pointer or indicator referring to a predefined document template describing the user specific service data, the template being preconfigured and known in the application server.

5. The method according to claim 4, wherein the request includes the service data information as a parameter in an Application Server Name URL field of the matching iFC, which is received as a URI parameter in a route header of the request.

6. A session control node configured to enable execution of a communication service adapted to a client by an application server, the session control node comprising:
   a receiving unit adapted to receive a request related to the client when non-registered,
   a fetching unit operable on a processor adapted to fetch, from a central subscriber data node, one or more initial Filter Criteria (iFC) configured for the client and including service data information related to user specific service data valid for the client, the user specific service data comprising service authorization data or service configuration data for the client,
   an extracting unit operable on the processor adapted to extract service data information from a matching iFC from the one or more iFC of the client that matches the request, and
   a forwarding unit adapted to forward the request to the application server with the service data information attached, the session control node thereby enabling the application server to create the user specific service data for the client based on the service data information attached in the request, in order to apply the user specific service data when the application server is serving the client,
   wherein the service data information comprises a pointer or indicator referring to a predefined document template describing the user specific service data, the template being preconfigured and known in the application server.

7. An application server for enabling a communication service adapted to a client, the application server comprising:
   a request managing unit adapted to receive, from a session control node, a request for the client with service data information relating to user specific service data valid for the client, the user specific service data comprising service authorization data or service configuration data for the client, wherein the service data information has been extracted from a matching initial Filter Criteria (iFC) from one or more iFC of the client that matches the request, and
   a service data unit adapted to create or modify user specific service data for the client in the application server based on the service data information attached in the request, for serving the client by applying the user specific service data,
   wherein the service data information comprises a pointer or indicator referring to a predefined document template describing the user specific service data, the template being preconfigured and known in the application server.

* * * * *

UNITED STATES PATENT AND TRADEMARK OFFICE
CERTIFICATE OF CORRECTION

| | | |
|---|---|---|
| PATENT NO. | : 8,843,546 B2 | Page 1 of 1 |
| APPLICATION NO. | : 13/319471 | |
| DATED | : September 23, 2014 | |
| INVENTOR(S) | : Hänström et al. | |

It is certified that error appears in the above-identified patent and that said Letters Patent is hereby corrected as shown below:

Title Page, item (12), "Hanstrom et al." should read -- Hänström et al. --.

Title Page, item (75), under "Inventors", in Column 1, Line 1, delete "Nils Hanstrom, Ronninge (SE);" and insert -- Nils Hänström, Rönninge (SE); --, therefor.

Signed and Sealed this
Twenty-eighth Day of April, 2015

Michelle K. Lee
*Director of the United States Patent and Trademark Office*